United States Patent [19]

Plummer

[11] Patent Number: 4,843,481
[45] Date of Patent: Jun. 27, 1989

[54] CCD SCANNING APPARATUS FOR USE WITH ROTARY HEAD PRINTER

[75] Inventor: William T. Plummer, Concord, Mass.

[73] Assignee: Polaroid Corporation, Cambridge, Mass.

[21] Appl. No.: 126,402

[22] Filed: Nov. 30, 1987

[51] Int. Cl.$^4$ .................. H04N 1/04; H04N 1/10; H04N 1/23

[52] U.S. Cl. ............... 358/296; 358/213.11; 358/213.13; 358/212; 358/292; 358/293; 358/285; 369/111

[58] Field of Search ............ 369/101, 111, 906; 358/213.11, 213.13, 347, 348, 296, 285, 292, 293, 212

[56] References Cited

U.S. PATENT DOCUMENTS

| | | | |
|---|---|---|---|
| 3,670,099 | 6/1972 | Oliver | 178/6 |
| 3,709,602 | 1/1973 | Satomi | 355/49 |
| 4,163,600 | 8/1979 | Russell | 350/6.7 |
| 4,204,230 | 6/1980 | Sprague | 358/213 |
| 4,219,704 | 8/1980 | Russell | 179/100.3 B |
| 4,290,689 | 9/1981 | Kleinschnitz, Jr. | 355/1 |
| 4,321,700 | 3/1982 | Russell | 369/44 |
| 4,426,696 | 1/1984 | Brenden et al. | 369/112 |
| 4,467,361 | 8/1984 | Ohno et al. | 358/213 |
| 4,641,184 | 2/1987 | Alston | 358/75 |
| 4,663,518 | 5/1987 | Borror et al. | 235/487 |

Primary Examiner—E. A. Goldberg
Assistant Examiner—Scott A. Rogers
Attorney, Agent, or Firm—Edward S. Roman

[57] ABSTRACT

A CCD pixel pattern for receiving an image to be recorded by a rotary head printer as a series of record track scans each having a predetermined curve geometry. The pixels are arranged in rows having a curvature proportional to the record track scan geometry so that the physical location of incident image light seen by each pixel will correspond directly to the physical location of the printed image increment originating with each pixel, respectively.

2 Claims, 2 Drawing Sheets

CCD SCANNING APPARATUS FOR USE WITH ROTARY HEAD PRINTER

BACKGROUND OF THE INVENTION

This invention relates to image recording apparatus and, more particularly, it concerns such apparatus which is adapted to record an electronic image generated by a video camera, for example, on a print media scanned by a rotary print head.

The extensive use of card-form media for credit purchasing, licensing and personal identification purposes has led to increased efforts to avoid unauthorized card use and counterfeiting. Early on in the production of identification cards, for example, it was recognized that the provision of various types of visual information on a single card media, such as a photograph, made identification card alteration difficult to accomplish without detection. As a result, highly sophisticated I.D. camera systems are commonly used to combine a colored portrait of the identified person, the identified person's signature and perhaps fingerprints as well as other forms of data in a single photographically produced identification card. Additionally, such equipment had been supplemented with equipment to provide machine readable data on the photographically produced identification cards. The machine readable data is usually recorded on a magnetic strip coated or otherwise mounted on a portion of the card.

More recently, developments in optical or laser printers as well as in the recording media available for use with such printers have provided a capability for recording on a single media card, not only a colored pictorial image of the card holder but also a combination of colored text and machine readable digital code. An identification card read/write system of this type is disclosed in commonly assigned U.S. Pat. No. 4,663,518 issued to Alan Borror et al on May 5, 1987. In this type of system, the pictorial image of the card holder is provided in electronic signal form by a conventional video camera. The video signals are combined with text and data signals in a microprocessor capable of modulating the light source of a laser printer during a single printing operation on the card.

To produce a continuous tone image of the type represented by a colored portrait of a card holder, the laser printer must be capable of traversing a series of closely spaced or adjacent line-form record tracks on the card media in a manner analogous to the presentation of such an image on the CRT of a video receiver. While the existing state of the laser printer art allows a wide latitude of recording track configurations and formats, a combination of high printing speeds and simplicity of required optics is provided by rotary head laser printers of a type disclosed in U.S. Pat. Nos. 4,163,600; 4,219,704; 4,321,700; and 4,426,696. In rotary head printers of this type, optical energy from a single light source is directed to a print media successively through each of a plurality (e.g. five) lenses carried in a continuously rotated wheel. The angular spacing and radial distance of the lenses from the center of wheel rotation is selected in relation to the dimensions of the print media area to be recorded so that with linear movement of the media transverse to the arc traveled by each lens, the requisite series of closely spaced or adjacent record tracks are provided on the media. The combination of arcuate lens travel and linear media feed results in each of the tracks lying on a compound curve.

Although the curved configuration of the record tracks developed by rotary head laser printers is not, in itself, deleterious to the formation of a continuous tone colored image inasmuch as the lines are not visibly discernable without magnification, a problem arises in converting a video image, as read or sensed by a high resolution charge coupled device (CCD) typically used in video cameras, to the curved track configuration of the rotary head laser printer. In particular, video cameras presently use a CCD in the form of a two-dimensional array of sensing elements or pixels aligned in mutually orthogonal striaght lines and columns. Each image sensing pixel converts the incident image defining scene light rays into a corresponding analog voltage value which are thereafter serially transferred out of the CCD to appropriate signal processing circuitry and ultimately as a composite modulated signal to the print head of the printer, in this instance, the light source of the rotary head laser printer. In light of the curved configuration of the printed record tracks as against the straight line configuration of the CCD pixels, the resulting printed image will be distorted in the absence of compensation in the signal processing circuitry. Even if the geometric disparity between the pixel array of the CCD and the printed record was corrected by the signal processing circuitry, some loss of resolution would necessarily result in the printed image.

Accordingly, there is a need for a solution to the problems presented by the use of a converted CCD image with rotary head printers of the general type described.

SUMMARY OF THE INVENTION

In accordance with the present invention, the problems associated with recording a video image using a rotary head printer are substantially solved by providing a CCD pixel array in a pattern geometrically compatible with record track configuration developed by the printer. As a result, the serial transfer of pixel voltage values from the CCD and conversion thereof to a composite modulated signal for the printer may occur without special processing and without loss of printed image resolution.

Thus, where the rotary head printer develops a series of record tracks on the print media, each of the record tracks defining a predetermined curve, the CCD pixel array used to supply a composite modulated signal to the printer is in a pattern of pixel rows where each pixel row lies on a curve which is geometrically proportional to the predetermined record track curve. When the analog voltage value of the pixels is serially transferred, row by row, to signal processing circuitry and as a composite modulated signal to the printer, the image resulting from the successive record tracks on the media will be a true reproduction of the image seen by the CCD.

A prinicpal object of the present invention, therefore, is the provision of a CCD pixel array or pattern by which the transfer of image information from the CCD to a printer is facilitated without loss of image resolution. Other objects and further scope of applicability of the present invention will become apparent from the detailed description to follow taken in conjunction with the accompanying drawings in which like reference numerals designate like parts.

DETAILED DESCRIPTION OF THE PREFERRED EMBODIMENT

Figure 1:
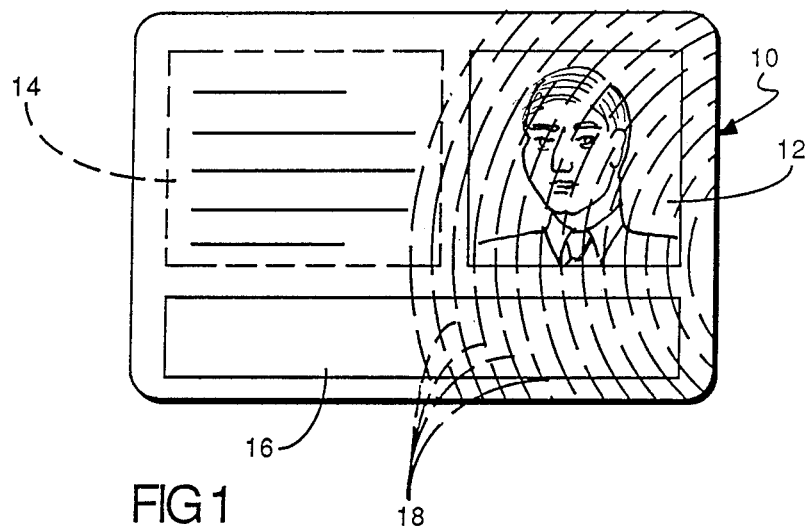
FIG. 1 is an illustration of a single media identification card exemplary of a printed image formed by the apparatus of the present invention.

In FIG. 1 of the drawings, the face of an identification card, generally designated by the reference numeral 10, is shown to be divided into three areas 12, 14 and 16. The area 12, as depicted in FIG. 1, is intended to receive a pictorial image of the card holder whereas the area 14 receives printed or visual text which may contain a variety of information such as the card issuing entity, the name of the card holder and other similar type of printed information. The third strip like area 16 is intended to receive machine readable optical digital data for verification of card holder authenticity and other purposes known in the art.

The identification card 10 is of a construction described fully in the above-mentioned, U.S. Pat. No. 4,663,518, the disclosure of which is expressly incorporated herein by reference to the extent that it is needed to understand and practice the present invention. As such, the construction of the card 10 incorporates a plurality of color imaging layers which are capable of independent exposure to optical energy of a modulated laser beam to provide all three forms of information recorded in the areas 12, 14 and 16.

As described in the afore-mentioned U.S. Pat. No. 4,663,518, such exposure of the multi layer media on the card 10 is effected by generating a series of closely spaced or adjacent recording tracks, each track representing a line segment of the information recorded on the card. The recording track lines are sufficiently narrow so that a relatively high resolution continuous tone color image can be developed in this way. The configuration of the record tracks will, of course, correspond to that of the laser scanning path relative to the plane of the card 10 and may be linear. The present invention, however, is concerned with accommodating a curved record track configuration depicted by the series of dashed lines 18 partially superimposing the area of the card 10 in FIG. 1. While the lines 18 are illustrated as being spaced, it is to be understood that in practice, these lines will be adjacent to one another at least as it is possible to discern them with the naked eye.

The curvature of the record track lines 18 used to provide the information recorded on the card 10 is the result of using a rotary head laser printer of a type disclosed in the above-cited U.S. Pat. Nos. 4,163,600; 4,219,704; 4,321,700; and 4,426,696. While reference may be made to these issued U.S. patents for a more complete explanation of such rotary head printers, operating principles of such printers, at least to the extent that printer operation is relevant to the present invention, may be understood by reference to FIGS. 3 and 4 of the drawings.

Figure 3:
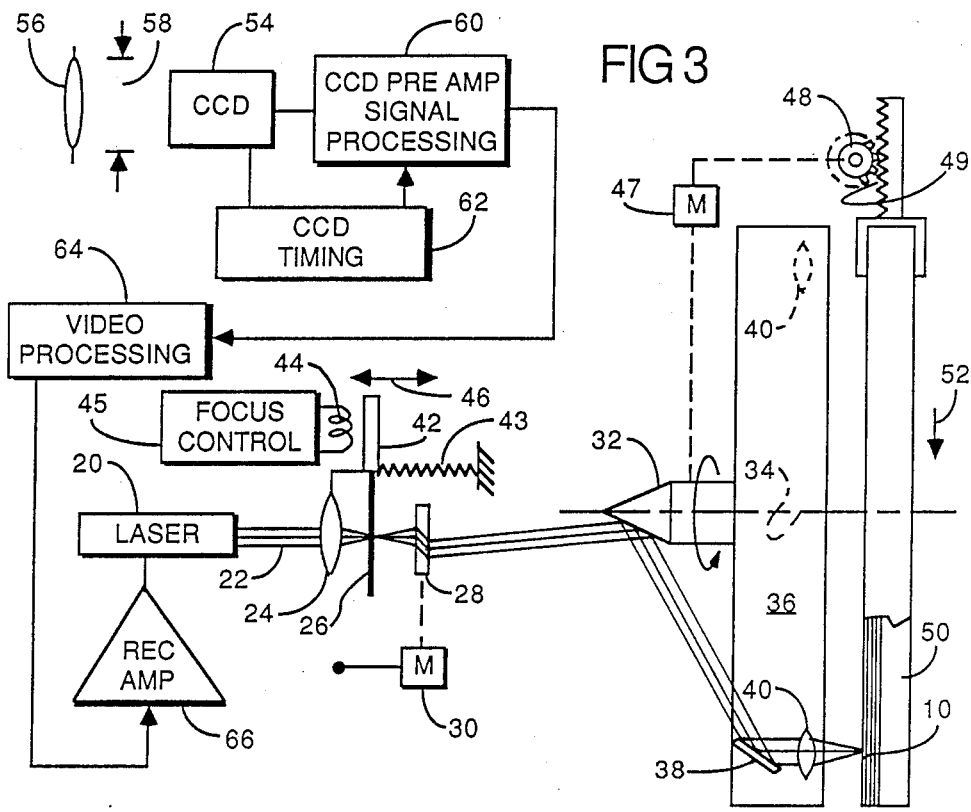
FIG. 3 is a schematic view illustrating a rotary head laser printer organization with which the present invention is particularly suited for use.

In FIG. 3, a source of optical energy represented by a laser 20 transmits a beam 22 of coherent light 22 to a primary lens 24. The lens 24 focuses the light beam to a small spot at an apertured light mask or pin hole element 26. A refraction plate 28, adjustably pivoted from a galvanometer type motor 30, is provided to control lateral displacement of the light beam issuing from the pin hole element 26 so that it is directed eccentrically to a distributor mirror 32 rotatable on an axis 34 with a scanner wheel 36. The distributor mirror 32 is in the nature of a five-sided polygon with five mirrors provided thereon so that the light beam passing from the refracting plate 28 is reflected to each of five objective mirrors 38 and objective lenses 40 carried in uniformly spaced relation by the scanner wheel 36. The light beam is focused by the lenses 24 and 40 to a small spot or point in a focus plane which may be varied in distance from the lenses 40 by focusing adjustment of the primary lens 24 and pin hole mask 26. To this end, the lens 24 and mask 26 are supported from an armature 42 movable against a biasing spring 43 by an electromagnetic coil 44 operated by a focus control circuit 45 so that the position of the lens 24 and mask may be adjusted in the direction of the arrow 46.

The distributor mirror 32 and scanner wheel 36 are driven in rotation by motor 47 which additionally drives a linear drive mechanism such as a pinion gear 48 and rack 49, the latter being connected to a card carrier 50. While other forms of drive mechanisms may be substituted for that represented in the drawings, it is important only that during continuous rotation of the wheel 36 and distributor mirror 32, the card holder 50 may also be advanced in the direction of the arrow 52. As a result of such combined movement, passage of the respective objective lenses 40 across the width of the card 10 supported on the carrier 50 will result in a series of successive objective lens passes which result in closely spaced recording tracks 18 on the card 10. Because the recording tracks are the result of both rotational movement of the objective lenses 40 and linear movement of the carrier 50, the configuration of each recording track 18 will be a compound curve. While the specific parameters of record track curvature will vary with geometric parameters of the operating components of different printing machines, the record tracks developed by a given printer will follow a curve having preestablished geometric characteristics.

The information recorded on each record track 18, whether representing a continuous tone colored pictorial image, printed text or machine readable digital data, is determined by modulation of light energy emitted from the laser 20 and also by the focus control circuit 44 where the print receiving media on the card 10 is in multiple layers representing different focus planes to which the light beam 22 is focused by the lenses 24 and 40 in the manner described above. Signal processing circuitry capable of modulating wavelengths of light emitted by the laser 20 is well known in the laser printer art and therefore represented only generally in the block diagram of FIG. 3 as including a CCD 54 for receiving an image passing a lens 56 and shutter 58; a CCD preamp signal processing circuit 60; a CCD timing circuit 62 and video processing circuit 64 and a recording amplifier 66.

Figure 2:
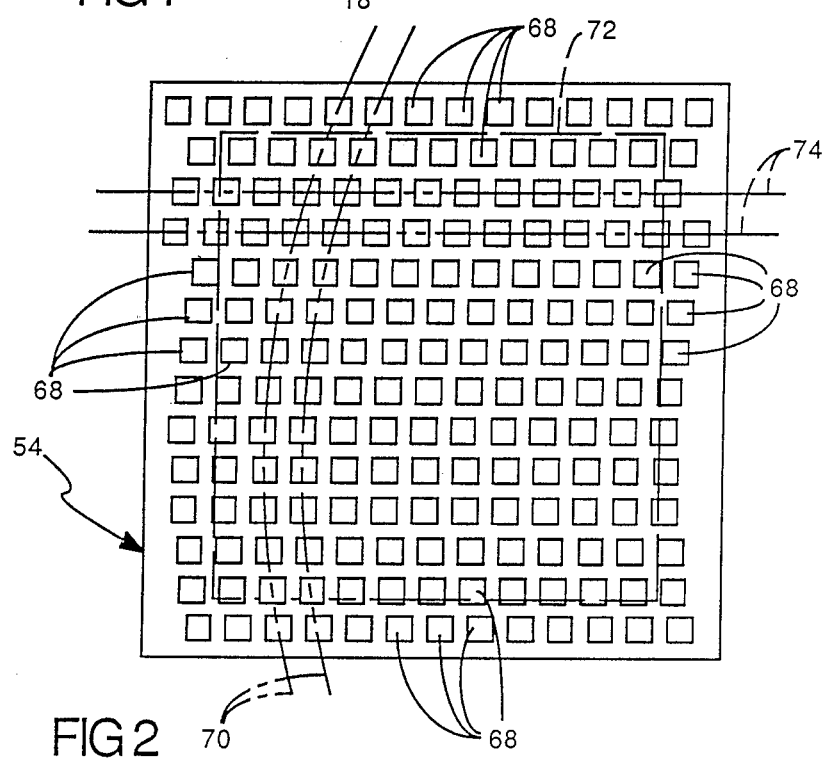
FIG. 2 is a largely schematic illustration of a CCD pixel pattern in accordance with the present invention.
Figure 4:
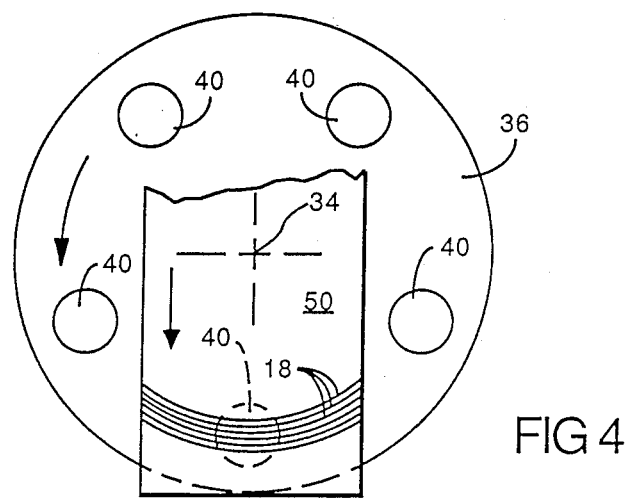
FIG. 4 is a fragmentary elevation as seen on line 4—4 of FIG. 3.

In accordance with the present invention, the CCD 54, which is the origin of electronic information signals supplied to the rotary head printer of FIGS. 3 and 4 to produce at least the pictorial image area 12 on the card 10, includes a two-dimensional array or pattern of light sensing pixels 68 depicted in FIG. 2 of the drawings. In the illustration of FIG. 2, the pixels 68 are shown as relatively large squares spaced substantially from each other solely in the interest of providing a graphic representation of the pattern in which they are arranged. It will be understood that in actual practice, the size of the individual pixels 68 will be much smaller and the spacing between the pixels much closer than that illustrated in FIG. 2 in order to produce a high resolution reproduction of the image presented to the CCD 54 by the lens 56.

In the pixel pattern of the present invention, the pixels 68 are arranged in a succession of curved rows 70, the curvature of each row being geometrically proportional to the curve defined by each record track 18 developed by the rotary printer apparatus of FIGS. 3 and 4. As a result of this pattern, the physical location of image increment defining light rays passing through the lens 56 to each pixel 68 will correspond directly to the physical location of a printed replica of that image increment on the card 10. Thus, upon conversion of each image increment to an analog voltage value by each pixel 68 and the serial transfer of that voltage value from the respective pixels in each row 70 by the CCD timing circuit 62 through the signal processing circuitry 60, 64 and 66 (FIG. 3) to the laser 20, the printed image increment represented by each record track 18 on the card 10 will be a faithful reproduction of the lens produced image increment seen by each row 70 of pixels 68.

As shown in FIG. 2, the effective image receiving area of the CCD 54 is delimited by a dashed line frame 72 which is smaller than the overall pixel array. This allows for the first several (e.g. 6–10) of the pixels 68 in each row 70 to be masked to provide a black or dark current reference value during signal transfer and processing a manner well known in the art.

In the pattern illustrated in FIG. 2, the pixels 68 are arranged to lie on straight lines 74 in a direction generally perpendicular to the curved rows 70. While this arrangement may be preferred for an assortment of reasons, such as ease of assembly of CCD or the like, it is not critical to practice of the invention inasmuch as the serial transfer of voltage values from the pixels 68 along each of the curved rows 70 to provide a corresponding record track 18 on the printed media of the card 10 would not require that the spacing of pixels be the same in each of the rows 70. In other words, it may be desirable from the standpoint of achieving a more dense pixel pattern to arrange the pixels in other than a linear orientation in a direction transverse to the curved rows 70.

As described in the above-mentioned U.S. Pat. No. 4,663,518, the multi-layer media of the card 10 is capable of recording full color images by focusing the modulated light energy passing the printer lenses 40 to different focal plane depths in the media which correspond to the separate layers of the media. Detection of color tones in the image passing the lens 56 to the CCD 54 may be accomplished in several ways, for example, the pixels 68 in the rows 70 may be alternately sensitive to red, green and blue frequencies of light in the image so that the composite of three pixels will establish the color tone at a corresponding spot location in the printed record of the image. Obviously, using separate pixels to discern different color frequencies results in a reduction in resolution. Alternatively, rotary filter wheels such as is disclosed in commonly assigned U.S. Pat. No. 4,641,184, the disclosure of which is expressly incorporated by reference herein, may be used so that the individual pixels alternatively sense the basic color frequencies in the image increment seen by each pixel. Still further, and in a controlled still photography environment like that available in the formation of an identification card, the CCD 54 may be exposed to successive images of a card holder using a succession of red, green and blue flashes. In this way, the color tones of the card holder's image may be faithfully reproduced on the card 10.

Thus it will be appreciated that as a result of the present invention, a highly effective CCD pixel array or pattern is provided by which the principal objective of the invention, among others, are completely fulfilled. It will be understood by those skilled in the art that various modifications and/or changes may be made in the embodiment illustrated and described herein without depature from the invention. Accordingly, it is expressly intended that the foregoing description and accompanying drawing illustrations are illustrative of a preferred embodiment only, not limiting, and that the true spirit and scope of the present invention be determined by reference to the appended claims.

What is claimed is:

1. In a CCD pixel array for sensing an image for subsequent recording by a rotary head printer of the type which prints a series of record tracks on a print media, wherein each of the record tracks represents a curved line segment of the image, the improvement comprising:
   a two-dimensional pattern of pixels defined by a plurality of spaced rows of pixels, each of said rows of pixels comprising a plurality of spaced pixels lying on a curve geometrically proportional to the curved line segment of the image to be printed.

2. In an apparatus for recording an image including a CCD having a two-dimensional array of pixels, means for presenting an image to the CCD, a rotary head laser printer for scanning a series of curved record tracks on a print media, and circuit means for transferring and processing analog voltage values generated by said pixels in response to incident image light to provide a printer scan modulating signal, the improvement comprising:
   a pattern of pixels defined by a series of spaced rows of pixels, each of said rows of pixels comprising a plurality of spaced pixels lying on a curve geometrically proportional to said curved record tracks scanned by the laser printer.

* * * * *